United States Patent [19]

Tyrell et al.

[11] Patent Number: 4,463,132

[45] Date of Patent: Jul. 31, 1984

[54] COMPOSITION COMPRISING A POLYOLEFIN AND A BLOCK COPOLYMER OF A DIHYDRIC PHENOL MONOMER, A CARBONATE PRECURSOR AND A POLYPHENYLENE OXIDE RESIN

[75] Inventors: John A. Tyrell, Mt. Vernon, Ind.; Ping Y. Liu, Naperville, Ill.; Gary L. Freimiller, Mt. Vernon, Ind.

[73] Assignee: General Electric Company, Mt. Vernon, Ind.

[21] Appl. No.: 504,443

[22] Filed: Jun. 15, 1983

[51] Int. Cl.$^3$ ..................... C08L 71/04; C08L 23/00
[52] U.S. Cl. ..................... 525/92; 524/494; 524/505; 525/88; 525/146; 525/905
[58] Field of Search ............... 525/133, 146, 905, 88, 525/92

[56] References Cited

U.S. PATENT DOCUMENTS 3,875,256  4/1975  White ........................... 525/905
4,383,082  5/1983  Lee, Jr. ........................ 525/905

Primary Examiner—Theodore E. Pertilla
Attorney, Agent, or Firm—Martin B. Barancik

[57] ABSTRACT

A novel thermoplastic composition is disclosed which is based on polyolefin and a block copolymer of a dihydric phenolic monomer, a carbonate precursor and a polyphenylene oxide resin. These compositions may be used as molding resins and have better compatibility than admixtures of aromatic polycarbonate and a polyolefin.

11 Claims, No Drawings

COMPOSITION COMPRISING A POLYOLEFIN AND A BLOCK COPOLYMER OF A DIHYDRIC PHENOL MONOMER, A CARBONATE PRECURSOR AND A POLYPHENYLENE OXIDE RESIN

This invention provides novel thermoplastic compositions which are based on an admixture of a polyolefin and a block copolymer of a dihydric phenol monomer, a carbonate precursor, and a polyphenylene oxide resin. These compositions may be used as molding resins or for the formation of fiber or films. Molded compositions have improved doublegated impact strength which makes them useful for diverse applications.

BACKGROUND OF THE INVENTION

Compositions of a polycarbonate resin and polypropylene are described in U.S. Pat. No. 3,801,673. These compositions are useful for many purposes but have been shown to produce molded articles that do not provide good weld line strength as measured in a double gate impact test. Various block copolymers of a polyphenylene oxide and a carbonate containing polymeric unit have been described in U.S. Pat. Nos. 3,875,256 and 3,703,564. These patents describe many techniques for forming various types of block copolymers and mention that these copolymers may be combined with various types of polystyrenes.

The applicants have found that a block copolymer containing a polyphenylene oxide block and a polycarbonate block derived from a dihydric phenol, are compatible with olefin polymers as shown by enhanced double gate impact strength as compared to a polycarbonate-olefin composition.

DETAILED DESCRIPTION OF THE INVENTION

The compositions of the invention comprise thermoplastic molding compositions which comprise:

(a) a block copolymer of the formula:

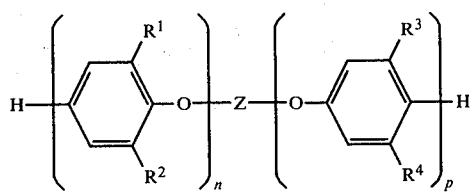

wherein $R^1$, $R^2$, $R^3$ and $R^4$ are selected from the group consisting of methyl and phenyl; n and p are the same or different and are the average number of repeating units in the block, each in the range of about 40 to 170; Z is a divalent segment having the formula:

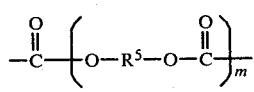

wherein $R^5$ is

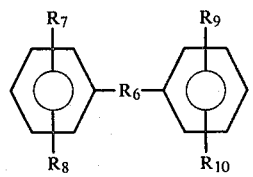

wherein $R_7$, $R_8$, $R_9$ and $R_{10}$ are the same or different and are hydrogen, alkyl of one to six carbon atoms, inclusive, chloro or bromo;

$R_6$ is a valence bond, oxa, thio, sulfinyl, sulfonyl, alkylene of two to four carbom atoms, inclusive and

wherein $R_{11}$ and $R_{12}$ are the same or different and are hydrogen or alkyl of one to three carbon atoms, inclusive and m represents the number of repeating units and is in the range of from 1 to 20; and (b) a polymer of an alpha-olefin of the formula $RCH=CH_2$ wherein R is hydrogen or alkyl of from 1 to 6 carbon atoms, inclusive.

The block copolymers that are useful in the practice of the invention are described in U.S. Pat. Nos. 3,703,564 and 3,875,256, both of which are incorporated by reference. Generally, the block copolymer may comprise from 1.0 to 99.0% by weight of the copolymer (c) and 99.0 to 1.0% by weight of the divalent segment (d). A more preferred range for component (c) is from 20 to 80% by weight and from 80 to 20% by weight of component (d).

The block copolymers may be prepared according to the procedures set forth in U.S. Pat. Nos. 3,703,564 and 3,875,256. In general a preferred method cpmprises the steps of combining a mixture of a diphenolic compound, a polyphenylene oxide polymer, a solvent, water and a tertiary amine with an appropriate amount of phosgene. Thereafter the polymer is separated and precipitated by pouring the solvent layer into an antisolvent such as methanol.

The olefin polymers are well known and include high and low density polyethylene, polypropylene, poly-1-butene, polypentene, polymethylpentene and linear low density polyolefins such as polyethylene and the like.

Alkyl of one to six carbon atoms, inclusive, includes branched as well as normal alkyl. Examples of alkyl include methyl, ethyl, propyl, isopropyl, butyl, tert. butyl, isopentyl, and the like.

The compositions of the invention may comprise from 5 to 50 weight percent and more preferably from 15 to 30 weight percent of (a) the block copolymer and from 95 to 50 and more preferably from 85 to 70 weight percent of (b) the polymer of the alpha-olefin. The weight percent is calculated on the basis of the total weight of (a) and (b) in the admixture.

The compositions of the invention may include reinforcing fillers, such as aluminum, iron or nickel and the like and nonmetals, such as carbon filaments, silicates, such as acicular calcium silicate, acicular calcium sulfate, wollastonite, asbestos, titanium and titanate and titanate whiskers, glass flakes and fibers and mixtures thereof. It is also to be understood that, unless the filler adds to the strength and stiffness of the composition, it is only a filler and not a reinforcing filler, as contemplated herein. In particular, the reinforcing fillers increase the flexural strength, the flexural modulus, the tensile strength and the heat distortion temperature.

Although it is only necessary to have at least a reinforcing amount of the reinforcement present, in general, the reinforcing filler may comprise from about 1 to about 40 parts by weight of the total composition.

In particular, the preferred reinforcing fillers are of glass, and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments for reinforcement are made by mechanical pulling. The filament diameters range from about 0.003 to 0.009 inch, but this is not critical to the present invention.

By glass fibers, it is understood that glass silk, as well as all glass fiber materials derived therefrom including glass fiber fabrics, rovings, staple fibers and glass fiber mats are included. The length of the glass filaments and whether or not they are bundled into fibers and the fibers bundled in turn to yarns, ropes or rovings, or woven into mats, and the like, are also not critical to the invention. However, when using fibrous glass filaments, they may first be formed and gathered into a bundle known as a strand. In order to bind the filaments into a strand so that the strand can be handled, a binder or binding agent is applied to the glass filaments. Subsequently, the strand can be chopped into various lengths of from $\frac{1}{8}$" to about 1" long, preferably less than $\frac{1}{4}$" in length. These are called chopped strands. Some of these binding agents are polymers such as polyvinyl acetate, particular polyester resins, polycarbonates, starch, acrylic melamine or polyvinyl alcohol. Preferably, the composition contains from about 1 to about 50 weight percent of the glass fibers.

Flame retardant amounts of flame retardants may also be utilized in the composition of the invention in amounts of from 0.5–50 parts by weight of the resinous components. Examples of suitable flame retardants may be found in U.S. Pat. Nos. 3,936,400 and 3,940,366 which are incorporated by reference. Other conventional nonreinforcing fillers, antioxidants, extrusion aids, light stabilizers, foaming agents such as those disclosed in U.S. Pat. No. 4,263,409 and Ger. Offen. 2,400,086 which are incorporated by reference and the like may be added to the composition of the invention if desired.

The manner of preparing the inventive composition is conventional. Preferably, each ingredient is added as part of a blend premix and the latter is mixed, e.g., by passage through an extruder, or by fluxing on a mill at a temperature dependent on the particular composition. The mixed composition may be cooled and cut up into molding granules and molded into the desired shape.

The term double gate (DG) is used herein and in the examples to report the weld line strength of samples prepared in a double gate mold which have been tested according to ASTM D-256. The superscripts for the impact data in the examples refer to the percent ductility of the samples at break. Units for notched Izod are in kgf cm/cm of notch; DG values are in Kg-cm.

The term alkylene is used herein to signify the group $-CH_2-_x$. Normal and branched alkylene are within the definition. An example of a branched alkylene is

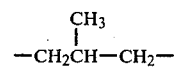

DESCRIPTION OF THE PREFERRED EMBODIMENTS

EXAMPLE 1

To a reactor vessel was added 90.0 g. of 2,2'bis-(4-hydroxyphenyl)propane, 700 cc of methylene chloride, 400 cc of water, 90.0 g. of poly(2,6-dimethyl-1,4-phenylene)oxide; 0.72 g. of phenol and 1.05 ml of triethylamine. Phosgene was then introduced into the stirred mixture at a rate of about 1.0 g. per minute for 60 minutes. During the addition of phosgene, the pH is maintained at about 11 by the addition of aliquot amounts of 25% aqueous sodium hydroxide solution. After the phosgene was added, the layers of the reaction mixture were separated and the organic layer was washed three times with dilute hydrochloric acid and three times with distilled water. During each of the washings, 10 ml of acetone was added to facilitate phase separation. The copolymer is filtered, washed and dried. The resultant copolymer has an intrinsic viscosity of 0.577 dl/g as measured in methylene chloride at 25° C.

To 100 g. of the powdered copolymer is added 400 g. of polypropylene (Escorene PP2032, Exxon Chemicals, Houston, Tex.). After mixing, the blend is injection molded at about 240° C. into 3.2 mm and 6.4 mm test bars. These bars were tested and were found to have the following notched Izod impact strengths

|        | 3.2 mm        | 6.4 mm        | DG       |
|--------|---------------|---------------|----------|
| Impact | 2.3 kgf cm/cm | 2.8 kgf cm/cm | 28 Kg cm |

COMPARATIVE EXAMPLE

To 100 g. of a powdered polycarbonate derived from 2,2'-bis(4-hydroxyphenyl)propane having an IV of about 0.46 dl/g as measured in methylene chloride at 25° C. was added 400 g. of the polypropylene of Example 1. The mixture of powders was injection molded at about 240° C. into 3.2 mm and 6.4 mm test bars. There bars were tested and were found to have the following Izod impact strengths.

|        | 3.2 mm        | 6.4 mm        | DG        |
|--------|---------------|---------------|-----------|
| Impact | 2.3 kgf cm/cm | 3.0 kgf cm/cm | 4.4 Kg cm |

The increased compatibility as shown by the substantially higher double gate value with the composition of the invention is clear.

Obviously many variations will suggest themselves to those skilled in the art from the above-detailed description without departing from the scope or spirit of the invention. It is, therefore, to be understood that changes may be made in the particular embodiments of the invention as defined by the appended claims.

What is claimed is:
1. A composition which comprises:
(a) a block copolymer of the formula:

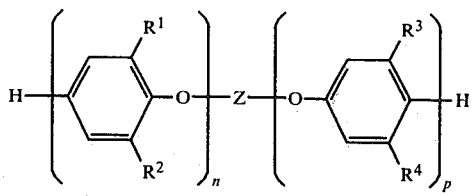

wherein $R^1$, $R^2$, $R^3$ and $R^4$ are selected from the group consisting of methyl and phenyl; n and p are the same or different and are the average number of repeating units in the block, each in the range of about 40 to 170; Z is a divalent segment having the formula:

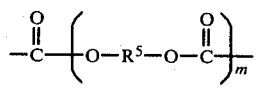

wherein $R^5$ is

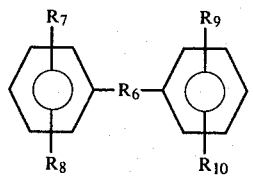

wherein $R_7$, $R_8$, $R_9$ and $R_{10}$ are the same or different and are hydrogen, alkyl of one to six carbon atoms, inclusive, chloro or bromo; $R_6$ is a valence bond, oxa, thio, sulfinyl, sulfonyl, alkylene of two to four carbom atoms, inclusive and

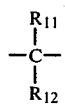

wherein $R_{11}$ and $R_{12}$ are the same or different and are hydrogen or alkyl of one to three carbon atoms, inclusive and m represents the number of repeating units and is in the range of from 1 to 20 in admixture with (b) a polymer of an alpha-olefin of the formula $RCH=CH_2$ wherein R is hydrogen or alkyl of from 1 to 6 carbon atoms, n and p selected so that the said composition is more compatible as measured by double gate than an admixture of an aromatic polycarbonate and (b).

2. A composition as defined in claim 1 wherein $R_1$, $R_2$, $R_3$ and $R_4$ are methyl.

3. A thermoplastic molding composition as defined in claim 2 wherein $R_5$ is derived from 2,2'-bis(4-hydroxyphenyl)propane.

4. A composition as defined in claim 3 wherein in the block copolymer the divalent segment comprises from 99.0 to 1.0% by weight.

5. A composition as defined in claim 4 wherein R is methyl.

6. A composition as defined in claim 1 which includes a reinforcing amount of a reinforcing filler.

7. A composition as defined in claim 1 which includes a flame retardant amount of a flame retardant agent.

8. A composition as defined in claim 6 which includes a flame retardant amount of a flame retardant agent.

9. A composition in accordance with claim 4 wherein the weight percent of a block copolymer is from about 15 to 30 weight percent and the polymer of the alpha olefin is from about 70 to 85 weight percent, based on the total weight of the block copolymer and the polymer of the alpha olefin.

10. A composition in accordance with claim 4 wherein the weight percent of a block copolymer is from about 5 to 50 weight percent and the polymer of the alpha olefin is from about 95 to 50 weight percent, based on the total weight of the block copolymer and the polymer of the alpha olefin.

11. A composition in accordance with claim 10 wherein in the block copolymer the divalent segment comprises from 20 to 80% by weight.

* * * * *